United States Patent
Nodomi (10) Patent No.: US 7,461,212 B2
(45) Date of Patent: Dec. 2, 2008

(54) NON-INCLUSIVE CACHE SYSTEM WITH SIMPLE CONTROL OPERATION

(75) Inventor: Akira Nodomi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 213 days.

(21) Appl. No.: 11/258,949

(22) Filed: Oct. 27, 2005

(65) Prior Publication Data
US 2007/0043914 A1 Feb. 22, 2007

(30) Foreign Application Priority Data
Aug. 22, 2005 (JP) ............................. 2005-240364

(51) Int. Cl.
*G06F 12/00* (2006.01)
(52) U.S. Cl. ..................... 711/141; 711/122; 712/205
(58) Field of Classification Search ................. 711/141, 711/122; 712/205
See application file for complete search history.

(56) References Cited

U.S. PATENT DOCUMENTS

| | | | |
|---|---|---|---|
| 5,564,035 A | | 10/1996 | Lai |
| 5,577,227 A | * | 11/1996 | Finnell et al. ............... 711/122 |
| 5,584,013 A | * | 12/1996 | Cheong et al. ............... 711/122 |
| 5,809,526 A | * | 9/1998 | Patel ........................... 711/122 |
| 6,070,233 A | * | 5/2000 | Whittaker .................... 711/144 |
| 6,073,212 A | * | 6/2000 | Hayes et al. ................. 711/122 |
| 7,103,720 B1 | * | 9/2006 | Moy et al. .................... 711/122 |

FOREIGN PATENT DOCUMENTS

| | | |
|---|---|---|
| JP | 5-324473 | 12/1993 |
| JP | 6-161887 | 6/1994 |
| JP | 2905188 | 3/1999 |

* cited by examiner

*Primary Examiner*—Kevin L Ellis
*Assistant Examiner*—Hashem Farrokh
(74) *Attorney, Agent, or Firm*—Staas & Halsey LLP (57) ABSTRACT

A cache system includes a processing device operative to access a main memory device, a primary cache coupled to the processing device and accessible from the processing device at faster speed than the main memory device, and a secondary cache coupled to the processing device via the primary cache and accessible from the processing device at faster speed than the main memory device, wherein the primary and secondary caches are configured such that first data is stored as a data entry in each of the primary and secondary caches when the first data is read from the main memory device in response to access from the processing device, and such that second data in the secondary cache is invalidated without invalidating the second data in the primary cache when a need arises to invalidate the second data in the secondary cache in response to access from the processing device.

9 Claims, 7 Drawing Sheets

NON-INCLUSIVE CACHE SYSTEM WITH SIMPLE CONTROL OPERATION

CROSS-REFERENCE TO RELATED APPLICATIONS

The present application is based upon and claims the benefit of priority from the prior Japanese Patent Application No. 2005-240364 filed on Aug. 22, 2005, with the Japanese Patent Office, the entire contents of which are incorporated herein by reference.

BACKGROUND OF THE INVENTION

1. Field of the Invention

The present invention generally relates to cache systems, and particularly relates to a cache system having a hierarchical cache memory structure.

2. Description of the Related Art

In computer systems, generally, a cache memory characterized by its small capacity and high speed is provided separately from the main memory. Part of the information stored in the main memory is copied to the cache. When this part of the information is to be accessed, it is retrieved from the cache rather than from the main memory, thereby achieving high-speed information retrieval.

A cache includes a plurality of cache lines. Copying of information from the main memory to the cache is performed in the units of cache lines. The memory space of the main memory is divided in the units of cache lines, and the divided memory areas are assigned to corresponding cache lines successively. Since the capacity of the cache is smaller than the capacity of the main memory, the memory areas of the main memory are assigned to the same cache lines repeatedly.

When a first access is performed with respect to a given address in the memory space, information (data or program) stored at this address is copied to the corresponding cache line in the cache. When a next access is performed with respect to the same address, the information is directly retrieved from the cache.

One cache line may be 32-byte long. In this case, for example, the five least significant bits of an address indicate an address offset, and a predetermined number of higher order bits adjacent to these bits indicate an index. The remaining further higher order bits indicate a cache tag.

When data is to be accessed, an index portion of the address indicating the access destination is used to read a tag associated with the corresponding index in the cache. A check is then made as to whether the retrieved tag matches the bit pattern of the tag portion of the address. If they do not match, a cache miss is detected. If they match, cache data (32-byte data equal in amount to one cache line) corresponding to the index is accessed. In the case of read operation, one byte of the 32-byte data is selected as indicated by the offset portion of the address, and is used as read data retrieved from the cache.

A cache configuration in which only one tag is provided for each cache line is referred to as a direct mapping method. A cache configuration in which N tags are provided for each cache line is referred to as an N-way set associative method. The direct mapping method can be regarded as a one-way set associative method.

In a write-through method, data writing is performed to the main memory as well as to a cache when the data needs to be written to memory. In this method, when there is a need to replace the contents of the cache, all that is necessary is to set a valid bit indicative of the valid/invalid state of the data to an invalid state. In a write-back method, on the other hand, data writing is performed only with respect to a cache when the data needs to be written to memory. Since the written data exists only in the cache memory, the contents of the cache memory need to be copied to the main memory when these contents in the cache are to be replaced.

In order to lessen a penalty associated with accessing the main memory at the time of a cache miss, a system with a hierarchical cache memory arrangement is used. For example, a secondary cache allowing a faster access than access to the main memory may be provided between a primary cache and the main memory. With this provision, the frequency of necessary accesses to the main memory is reduced at the time of the occurrence of a cache miss with respect to the primary cache, thereby lessening the cache miss penalty.

The configuration of a multi-level cache system may be classified mainly into three types as in the following from the viewpoint of the inclusion property of data between the caches. In the following, a two-level cache hierarchy is taken as an example, with the one closer to the computing unit being a primary cache, and the one closer to the main memory being a secondary cache. In general, a primary cache is characterized by its small capacity and high speed, and a secondary cache is characterized by its large capacity and low speed.

(1) Inclusive Cache

An inclusive cache refers to a cache system in which all the contents of the primary cache are stored in the secondary cache without exception. Namely, the contents of the secondary cache include the contents of the primary cache. This is the simplest configuration, and has an advantage in that logic for controlling the operation of the caches is easy to implement. A drawback is that an effective cache size is smaller than the total size of the caches (i.e., the size of the secondary cache+the size of the primary cache), and is limited to the size of the secondary cache at the maximum.

(2) Exclusive Cache

An exclusive cache refers to a cache system in which all the cache contents are only stored either in the primary cache or in the secondary cache. Namely, the contents of the primary cache and the contents of the secondary cache are exclusive to each other. The effective cache size is equal to the total size of the caches, which means that the highest memory utilization in the three methods is achieved. However, various demerits are in existence in terms of control operations, such as a need to make the secondary cache reflect all the replacements of contents of the primary cache. When the replacement of contents of the primary cache occurs frequently, further, it hampers data supply to the computing unit, which may results in lower performance.

(3) Non-Inclusive Cache (Partially Inclusive Cache)

A non-inclusive cache refers to a cache system which is basically an inclusive cache, but does not require the sustaining of inclusive property as an absolute requirement, thereby allowing the presence of a state in which a content of the primary cache is not included in the secondary cache. The non-inclusive cache may also refer to a cache system which is basically an exclusive cache, but does not require the sustaining of exclusive property as an absolute requirement, thereby allowing the presence of a state in which a content of the primary cache is included in the secondary cache. The effective cache size is between that of the inclusive cache and that of the exclusive cache. Difficulty associated with the implementation of control operation is also midlevel. Since there is not a strong demand for the processes for sustaining the inclusive property (or exclusive property), the lowering of performance of the primary cache associated with such processes may be reduced.

In the field of embedded processors, there is also a tendency that hierarchical cache systems are generally used. In the field of embedded processors, the cost of chip area size is extremely high, which requires the efficient use of RAMs implemented in the chip. From this viewpoint, the non-inclusive cache is more preferable than the inclusive cache, and the exclusive cache is more preferable than the non-inclusive cache. Since the time period typically spent on the development of chips in the field of embedded processors is very short, the exclusive cache is not a desirable system since the exclusive cache requires a large number of development steps and check steps.

Especially in the field of embedded processors, a system such as the non-inclusive cache having a relatively short development period and achieving a relatively efficient use of cache memory is desirable.

An example of the non-inclusive cache is disclosed in Patent Document 1. Further, Patent Document 2 discloses a system that reduces invalidating operations directed from the secondary cache to the primary cache in respect of cache inclusion property.

In the system disclosed in Patent Document 1, in order to achieve the non-inclusive cache effectively, information indicative of whether the contents of the primary cache are included in the secondary cache needs to be added to the tags of the primary cache. This enhances the effect of the non-inclusive system in that its control operations are easy, but necessitates an additional logic for the primary cache, which may result in an increase in the number of development steps.

[Patent Document 1] U.S. Pat. No. 5,564,035
[Patent Document 2] Japanese Patent Application Publication No. 6-161887
[Patent Document 3] Japanese Patent No. 2905118
[Patent Document 4] Japanese Patent Application Publication No. 5-324473

Accordingly, there is a need for a non-inclusive-type cache system that is easy to implement.

SUMMARY OF THE INVENTION

It is a general object of the present invention to provide a cache system that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a cache system particularly pointed out in the specification in such full, clear, concise, and exact terms as to enable a person having ordinary skill in the art to practice the invention.

To achieve these and other advantages in accordance with the purpose of the invention, the invention provides a cache system which includes a processing device operative to access a main memory device, a primary cache coupled to the processing device, the primary cache being accessible from the processing device at faster speed than the main memory device, and a secondary cache coupled to the processing device via the primary cache, the secondary cache being accessible from the processing device at faster speed than the main memory device, wherein the primary cache and the secondary cache are configured such that first data is stored as a data entry in each of the primary cache and the secondary cache when the first data is read from the main memory device in response to access from the processing device, and such that second data in the secondary cache is invalidated without invalidating the second data in the primary cache when a need arises to invalidate the second data in the secondary cache in response to access from the processing device.

According to another aspect of the present invention, a cache system includes a processing device operative to access a main memory device, a primary cache coupled to the processing device, the primary cache being accessible from the processing device at faster speed than the main memory device, and a secondary cache coupled to the processing device via the primary cache, the secondary cache being accessible from the processing device at faster speed than the main memory device, wherein the primary cache and the secondary cache are configured such that first data is kept as valid data in the secondary cache when the first data is transferred from the secondary cache to the primary cache for storage as a data entry in the primary cache in response to access from the processing device, and such that second data in the secondary cache is invalidated without invalidating the second data in the primary cache when a need arises to invalidate the second data in the secondary cache in response to access from the processing device.

According to at least one embodiment of the present invention, the same operations as those of the inclusive cache are performed as basic operations, but an invalidating process for invalidating corresponding data in the primary cache is omitted at the time of replacement of data in the secondary cache, thereby permitting the collapse of the inclusion condition. Through the omission of an invalidating process with respect to the primary cache, the cache control operations are simplified, thereby achieving an improvement in performance. Since the control for omitting an invalidating process for corresponding data in the primary cache at the time of replacement of data in the secondary cache is quite simple, the cache system can be easily implemented in a short development period.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the present invention, a non-inclusive cache is implemented through basic operations as follows.

(1) When stored information (data or program: hereinafter referred to as data) is fetched from the main memory for storage as a new data entry in the primary cache, the data is also stored as a data entry in the secondary cache.

(2) When data in the secondary cache is replaced, corresponding data in the primary cache is not invalidated even if the corresponding data is in existence in the primary cache.

The operation as defined in (1) is a typical operation performed in the inclusive cache. In the cache system according to the present invention, the same operation as that of the inclusive cache is performed at the time of creating a new data entry from the main memory, thereby creating an inclusion condition in which the data of the primary cache is basically present in the secondary cache. It should be noted that the operation defined in (1) is not an absolute requirement, and there can be an exception. If there is another operation that serves to create an inclusion condition basically the same as that of the inclusive cache, such operation also serves the purpose according to the present invention.

The operation defined in (2) serves to break the inclusion condition of the inclusive cache. In conventional inclusive caches, when there is a need to replace data in the secondary cache, there may be corresponding data in the primary cache. In such a case, this corresponding data in the primary cache needs to be invalidated (erased) in order to sustain the inclusion condition. In the present invention, on the other hand, when data is forced out of the secondary cache, the corresponding data in the primary memory is not invalidated. With this provision, the inclusion condition between the primary cache and the secondary cache is broken.

In the present invention as described above, the same operations as those of the inclusive cache are performed as basic operations, but an invalidating process for invalidating corresponding data in the primary cache is omitted at the time of replacement of data in the secondary cache, thereby permitting the collapse of the inclusion condition. Through the omission of an invalidating process with respect to the primary cache, the cache control operations are simplified, thereby achieving an improvement in performance. Since the control for omitting an invalidating process for corresponding data in the primary cache at the time of replacement of data in the secondary cache is quite simple, the cache system can be easily implemented in a short development time.

In the following, embodiments of the present invention will be described with reference to the accompanying drawings.

Figure 1:
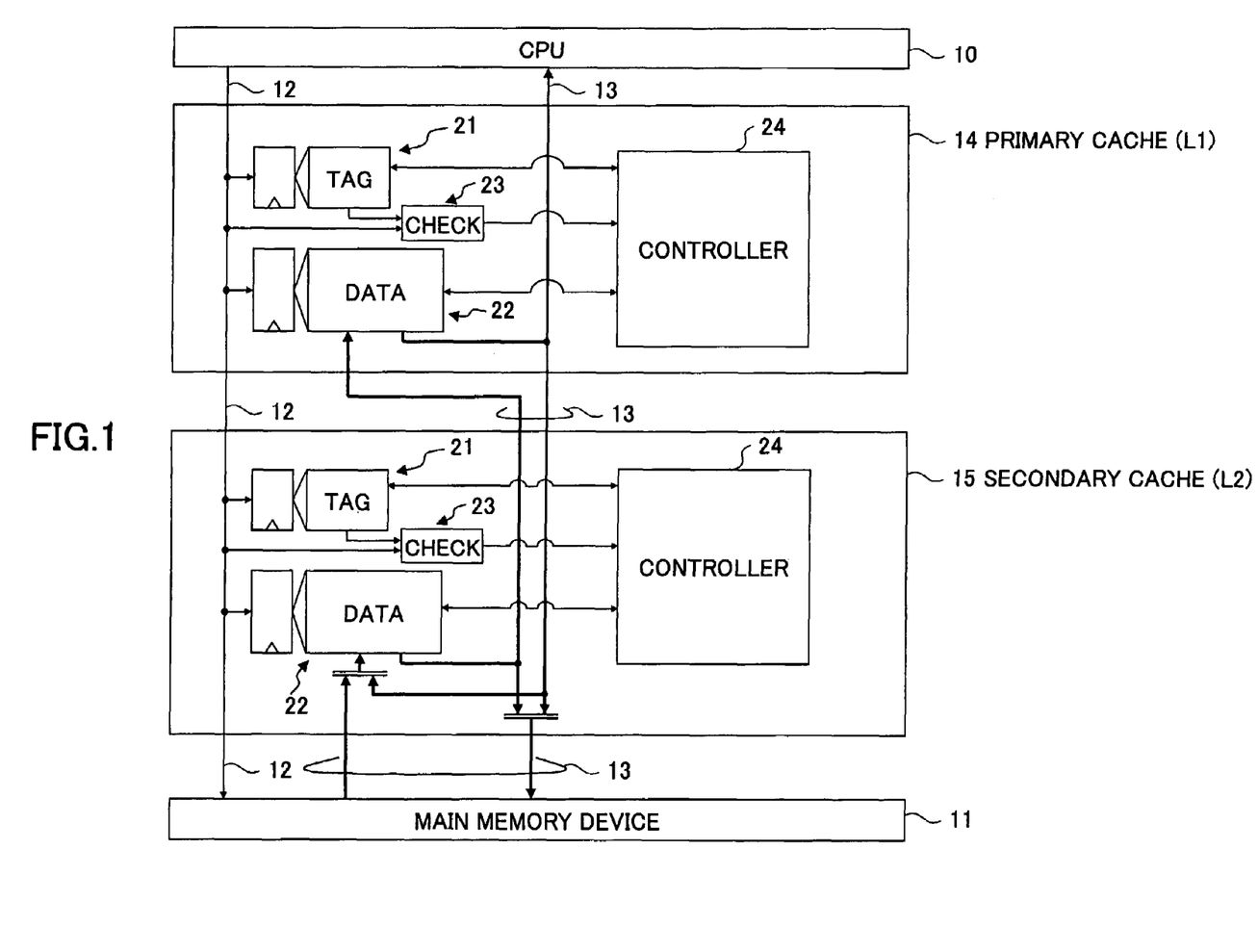
FIG. 1 is a block diagram showing a first embodiment of a cache system according to the present invention.

FIG. 1 is a block diagram showing a first embodiment of the cache system according to the present invention. FIG. 1 shows an example in which a primary cache and a secondary cache are provided. Notwithstanding this, the number of cache hierarchy levels and the number of caches at each level are not limited to the illustrated example.

The cache system of FIG. 1 includes a CPU 10, a main memory device 11, an address bus 12, a data bus 13, a primary cache (L1) 14, and a secondary cache (L2) 15. Each of the primary cache 14 and the secondary cache 15 includes a tag register portion 21, a data register portion 22, a check unit 23, and a controller 24. The configuration of the data bus 13 illustrated in FIG. 1 only demonstrates a logical flow of data for the explanation purpose, and are not intended to demonstrate physical connections.

Figure 2:
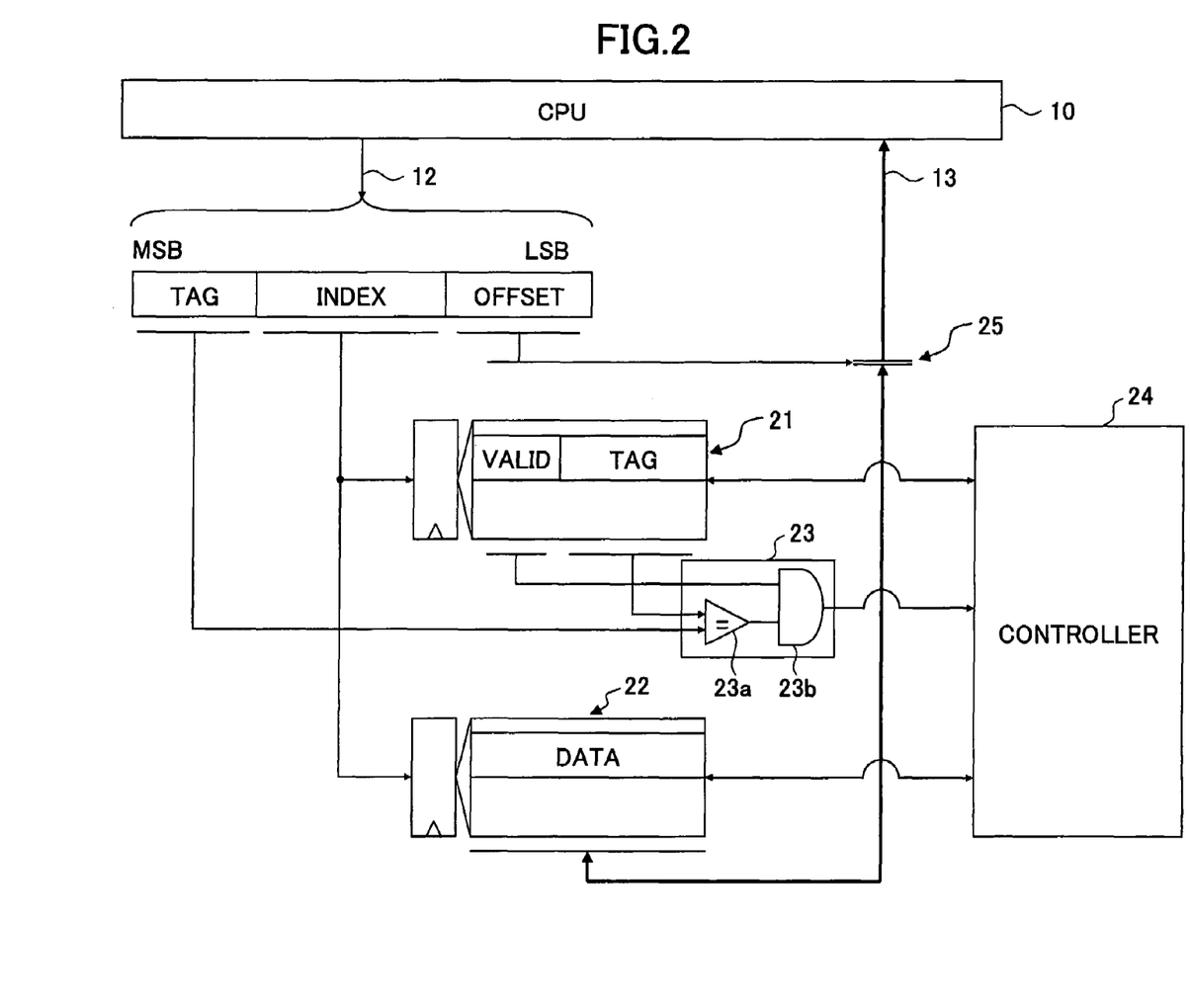
FIG. 2 is a drawing for explaining the operation of a primary cache or secondary cache.

FIG. 2 is a drawing for explaining the operation of the primary cache 14 or the secondary cache 15. If one cache line is 32-byte long, for example, the five least significant bits of an address indicate an address offset, and a predetermined number of higher order bits adjacent to these bits indicate an index. The remaining further higher order bits indicate a cache tag.

When data is to be accessed, an index portion of the address supplied through the address bus 12 indicating the access destination is used to read a tag associated with the corresponding index from the tag register portion 21. A comparator 23a of the check unit 23 then checks whether the retrieved tag matches the bit pattern of the tag portion of the supplied address. If the result of the comparison indicates a match, and if a valid bit "valid" in the tag register portion 21 corresponding to the index has a valid value "1", the output of an AND gate 23b of the check unit 23 is asserted. Based on this output from the check unit 23, a check is made as to whether an access to the cache is a hit or a miss.

In response to the result of the check by the check unit 23, the controller 24 controls each portion of the cache. When an access is a hit in the case of a read operation, the controller 24 performs a control operation so as to read data (i.e., 32-byte data equal in amount to one cache line) corresponding to the index from the data register portion 22 to the data bus 13. A selector 25 then selects one byte from the retrieved data as indicated by the offset portion of the read address, and the selected byte is supplied as read data. Needless to say, the configuration may be such that the check unit 23 is provided as part of the controller 24.

The controller 24 performs various control operations relating to cache management. For example, the controller 24 may set a valid bit, may set a tag, may search for an available cache line by checking valid bits, may select a cache line to be replaced based on the LRU (least recently used) algorithm or the like, may control a data write operation with respect to the data register portion 22, etc.

Referring FIG. 1 again, the CPU 10 transmits an address to be accessed to the address bus 12, thereby performing a read/write operation with respect to the memory space. When the CPU 10 attempts to accesses an address in the memory space, a check is first made as to whether data of this address is stored in the primary cache 14. This check is performed by the check unit 23 and the controller 24 based on tag information contained in the tag register portion 21 of the primary cache 14. If the data of this address is stored in the primary cache 14, this data is supplied from the data register portion 22 to the CPU 10 via the data bus 13 in the case of a read operation. In the case of a data write operation, write data supplied from the CPU 10 via the data bus 13 replaces the data of the cache that is identified as a hit.

If the data of the relevant address is not stored in the primary cache 14, a check is made as to whether the data of this address is stored in the secondary cache 15. This check is performed by the check unit 23 and the controller 24 based on tag information contained in the tag register portion 21 of the secondary cache 15. If the data of this address is stored in the secondary cache 15, this data is supplied from the data register portion 22 to the CPU 10 via the data bus 13 in the case of a read operation. This data is also supplied to the primary cache 14 via the data bus 13 for storage as a data entry in the primary cache 14. Namely, the data is stored in the data register portion 22 of the primary cache 14, and the corresponding tag is stored in the tag register portion 21 of the primary cache 14, with the corresponding valid bit being set to a valid state. In the case of a data write operation, write data supplied from the CPU 10 via the data bus 13 replaces the data of the cache that is identified as a hit.

If the data of the relevant address is stored in neither the primary cache 14 nor the secondary cache 15, the data stored at this address is retrieved from the main memory device 11 via the data bus 13 to be copied in a corresponding cache line in the caches. In so doing, the present invention performs the same operations as those of the inclusive cache system. That is, the data retrieved from the main memory device 11 is stored as a data entry both in the secondary cache 15 and in the primary cache 14. In the case of a read operation, the CPU 10 loads the data supplied through the data bus 13. In the case of a write operation, the CPU 10 overwrites copied data in the caches.

In the case of a data write operation, the write-through method writes data to the primary cache 14 and/or to the secondary cache 15, and also writes the data to the main memory device 11 at the time of the data write operation. With this method, upon a need to replace a content of a cache, all that is necessary is to invalidate a valid bit indicative of the valid/invalid state of data. On the other hand, the write-back method writes data only to the primary cache 14 and/or to the secondary cache 15 at the time of the data write operation. Since the written data only exists in the cache memory, a content of the cache memory needs to be copied to the main memory device 11 when this content of the cache memory is to be replaced. In this case, one-bit information referred to as a dirty bit contained in the tag register portion 21 may be used in order to indicate whether the content of the cache matches the content of the main memory device 11.

Figure 3:
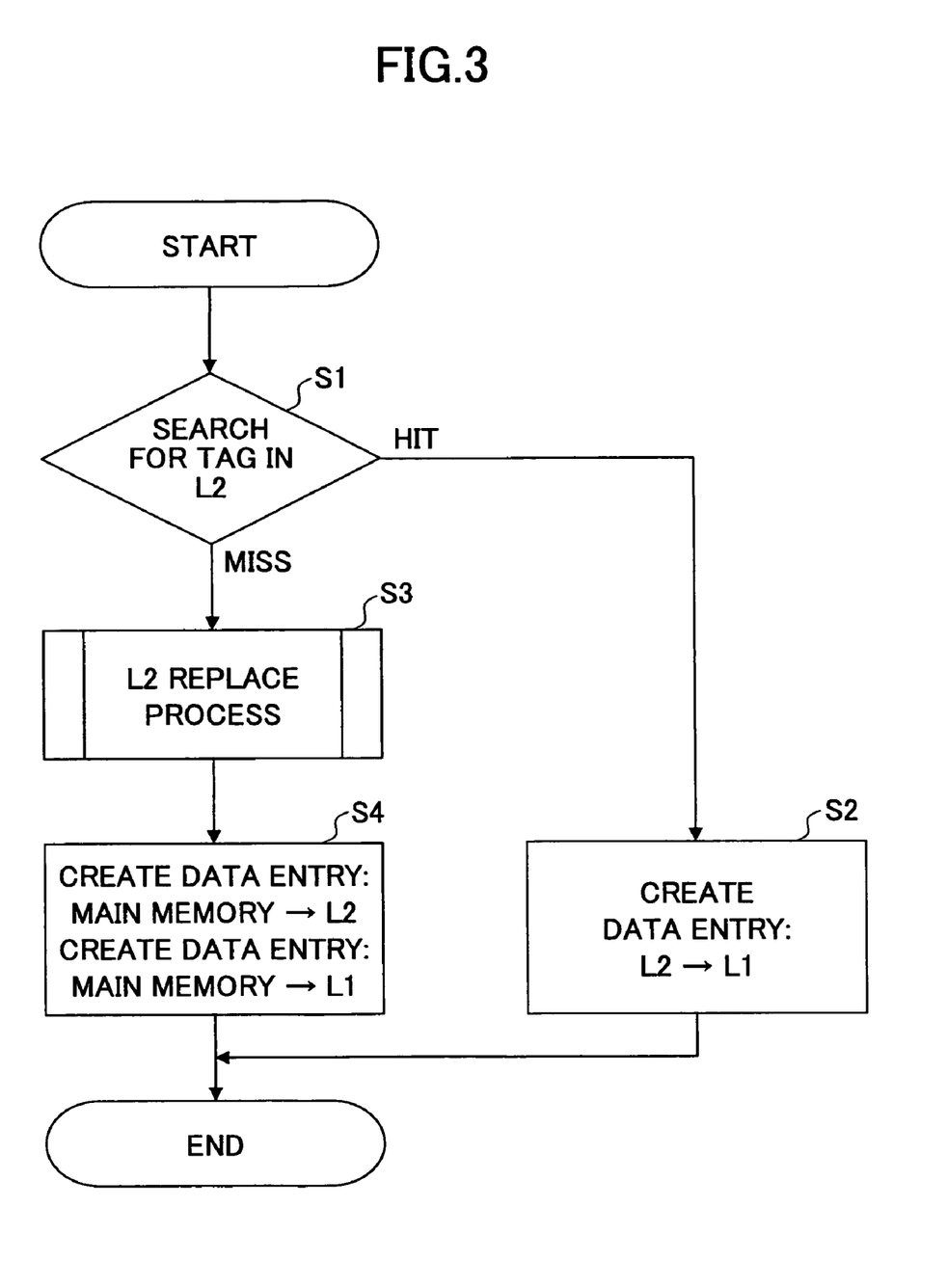
FIG. 3 is a flowchart showing a process performed when a memory access ends up being a cache miss with respect to the primary cache, and is then performed with respect to the secondary cache.

FIG. 3 is a flowchart showing a process performed when a memory access ends up being a cache miss with respect to the primary cache, and is then performed with respect to the secondary cache. At step S1, a tag is searched for in the secondary cache (L2) 15. If a hit is detected, at step S2, the data that is hit in the secondary cache 15 is stored as a data entry in the primary cache 14. Namely, the data is stored in the data register portion 22 of the primary cache 14, and the corresponding tag is stored in the tag register portion 21 of the primary cache 14, with the corresponding valid bit being set to a valid state.

If the tag search at step S1 produces a cache miss, at step S3, a replace process is performed with respect to the secondary cache 15. This will later be described. After the replace process, the main memory device 11 is accessed to read data therefrom, and the read data is stored as a data entry in the secondary cache 15 and also stored as a data entry in the primary cache 14.

The process described above is the same as that of the inclusive cache method as described above. That is, the data read from the main memory device 11 is stored as a data entry both in the secondary cache 15 and in the primary cache 14.

Figure 4:
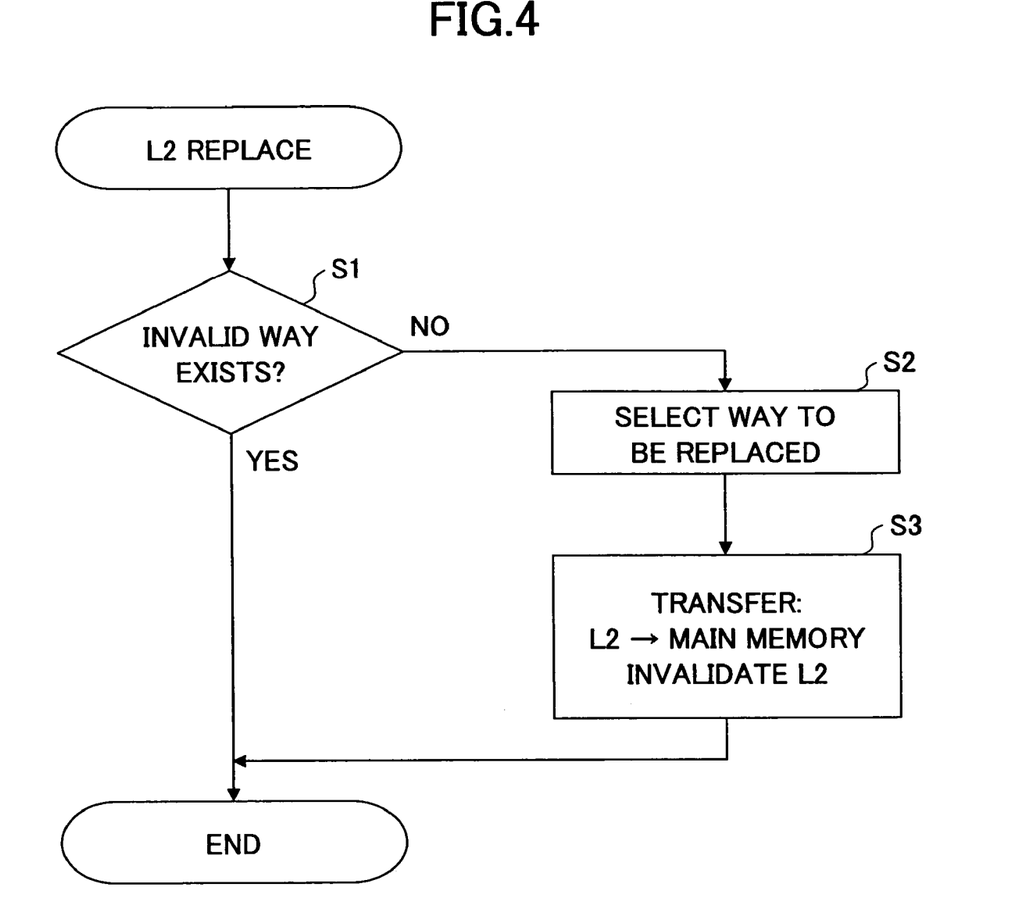
FIG. 4 is a flowchart showing the detail of a replace process shown in step S3 of FIG. 3.

FIG. 4 is a flowchart showing the detail of the replace process shown in step S3 of FIG. 3. At step S1, a check is made as to whether an invalid way is in existence. Namely, in the case of a set-associative method, a valid bit of each way (each set) corresponding to the index of the accessed address is checked to see whether there is an available cache area. If there is an available cache area, the procedure comes to an end.

If there is no available cache area, at step S2, a way (set) that is to be replaced is selected. Namely, a cache line that is to be replaced is selected. Such a selection may be performed according to any preferred algorithm, and may be performed by use of the LRU algorithm or the like, for example. At step S3, the content of the selected cache line of the secondary cache (L2) 15 is transferred to the main memory device 11. This transfer is performed in the case of the write-back method, and is performed when the dirty bit indicates "dirty" (inconsistency). In the case of the write-through method, there is no need to transfer the content of the cache line to the main memory device 11. At step S3, the selected cache line in the secondary cache 15 is invalidated. Namely, the valid bit of the selected way corresponding to the index of the accessed address is set to a value indicating an invalid state. After this, the selected cache line can be used. With this, the replace process comes to an end.

In the present invention, at step S3 of FIG. 4, invalidation with respect to the secondary cache 15 is only performed, and the corresponding data in the primary cache 14 is not invalidated. Namely, data in the secondary cache 15 is erased by replacement, but the corresponding data, if present in the primary cache 14, stays as stored data in the primary cache 14. As a result, the inclusion condition between the primary cache 14 and the secondary cache 15 is broken.

Figure 5:
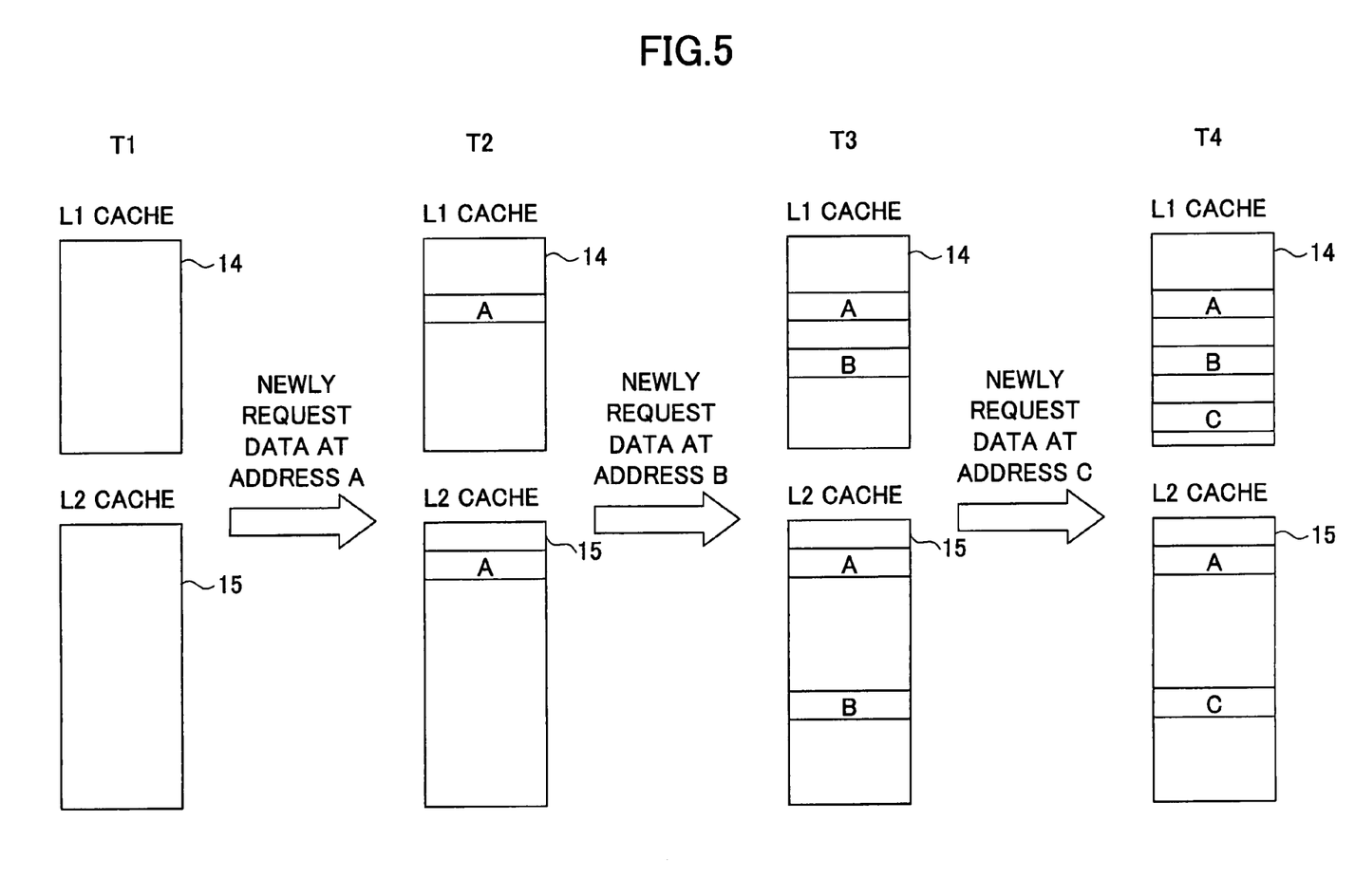
FIG. 5 is an illustrative drawing for explaining the way the inclusion condition between the primary cache and the secondary cache is broken.

FIG. 5 is an illustrative drawing for explaining the way the inclusion condition between the primary cache 14 and the secondary cache 15 is broken. Timing T1 indicates an initial state in which no data is stored in the primary cache (L1) 14 and the secondary cache (L2) 15. Then, the CPU requests data at an address A. In response to this request, the data of the address A is stored as a data entry in the primary cache 14 and in the secondary cache 15. The data of the address A stored as a data entry is illustrated as "A" at timing T2.

Thereafter, the CPU requests data at an address B. In response to the request, the data of the address B is stored as a data entry in the primary cache 14 and in the secondary cache 15. The data of the address B stored as a data entry is illustrated as "B" at timing T3.

Thereafter, the CPU requests data at an address C. In this case, the index of the address C differs from the index of the address B in the primary cache 14 while the index of the address C is the same as the index of the address B in the secondary cache 15. Such a situation may be encountered when the indexing methods are different between the primary cache 14 and the secondary cache 15. For example, indexes based on physical addresses may be used with respect to the primary cache 14 while indexes based on logical addresses may be used with respect to the secondary cache 15. Another example would be the case in which indexes for one cache are assigned linearly while indexes for the other cache are assigned according to the hash method. Further, the above situation may also be encountered when the degree of association (i.e., the number of ways) differs between the primary cache 14 and the secondary cache 15, for example.

Since the index of the address C differs from the index of the address B in the primary cache 14, the data of the address C is successfully stored as a data entry without replacing the data of the address B. In the secondary cache 15, on the other hand, the index of the address C is the same as the index of the address B, so that the data of the address C is stored as a data entry by replacing the data of the address B. The data of the address C stored as a data entry is illustrated as "C" at timing T4. For the sake of simplicity of explanation, a description has been given here of the replacement of the data of the address B by assuming the use of the direct map method. Even in the case of a set-associative method, however, the replacement of the data of the address B may become necessary when all the ways are currently used for valid data.

Consequently, such a situation comes into being that the data of the address B exists in the primary cache 14 at timing T4 while it does not exist in the secondary cache 15. Namely, the inclusion condition between the primary cache 14 and the secondary cache 15 is broken, resulting in a cache arrangement according to a non-inclusive system. This situation is brought about by omitting the operation that replaces corresponding data in the primary cache 14 at the time of replacement of the data in the secondary cache 15. Namely, a non-inclusive cache system is easily realized by omitting an operation performed in the conventional inclusive cache system.

Figure 6:
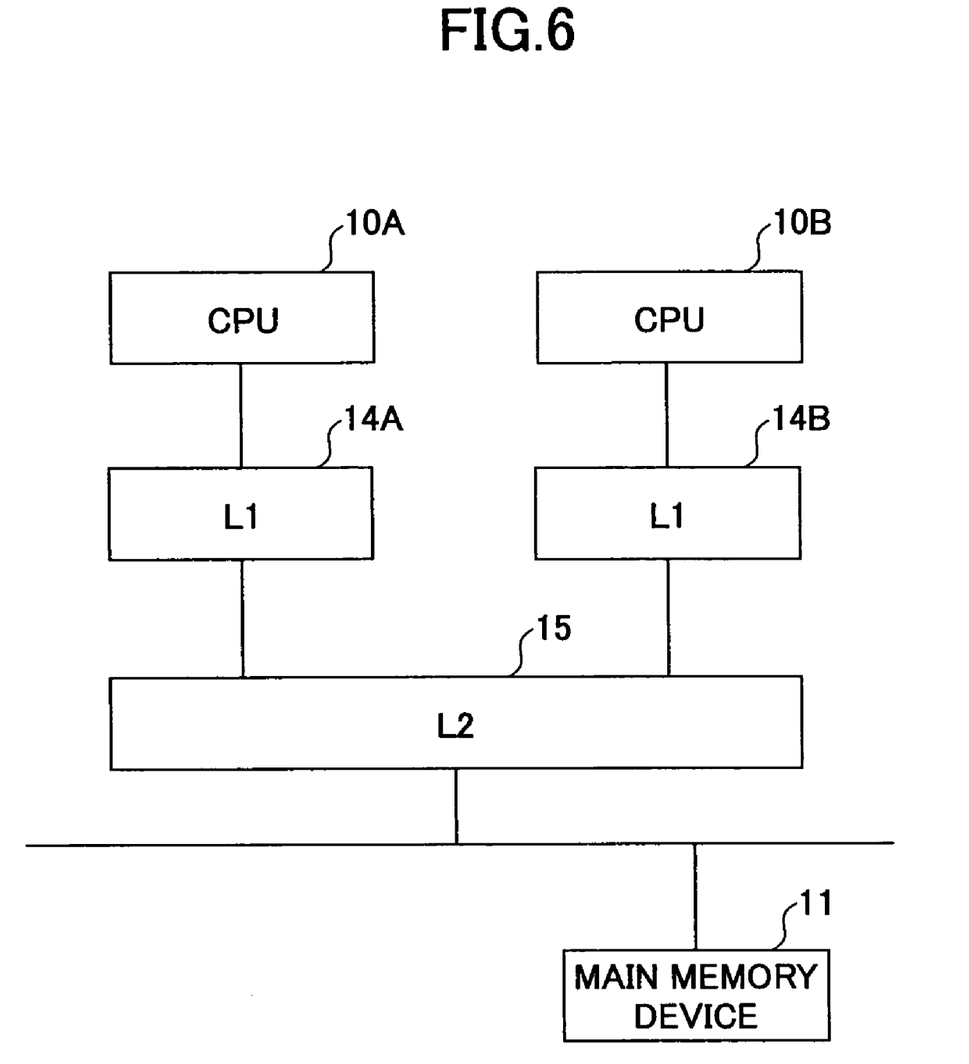
FIG. 6 is a block diagram showing a second embodiment of the cache system according to the present invention.

FIG. 6 is a block diagram showing a second embodiment of the cache system according to the present invention. FIG. 6 illustrates a multi-core system. The configuration of the illustrated example includes two CPUs 10A and 10B, two primary caches 14A and 14B, a single secondary cache 15, and the main memory device 11.

In the multi-core configuration in which the secondary cache is shared as illustrated, an increase in the number of cores (i.e., an increase in the number of primary caches coupled to the secondary cache) causes conflicts to occur increasingly frequently between requests from these cores, resulting in an increase in cache misses in the secondary cache. In the cache control according to the present invention in which a replace process with respect to the secondary cache does not affect the primary cache, there is no need for the invalidation of the primary cache upon a cache miss caused by such conflicts at the secondary cache, thereby reducing the load of the control process.

Figure 7:
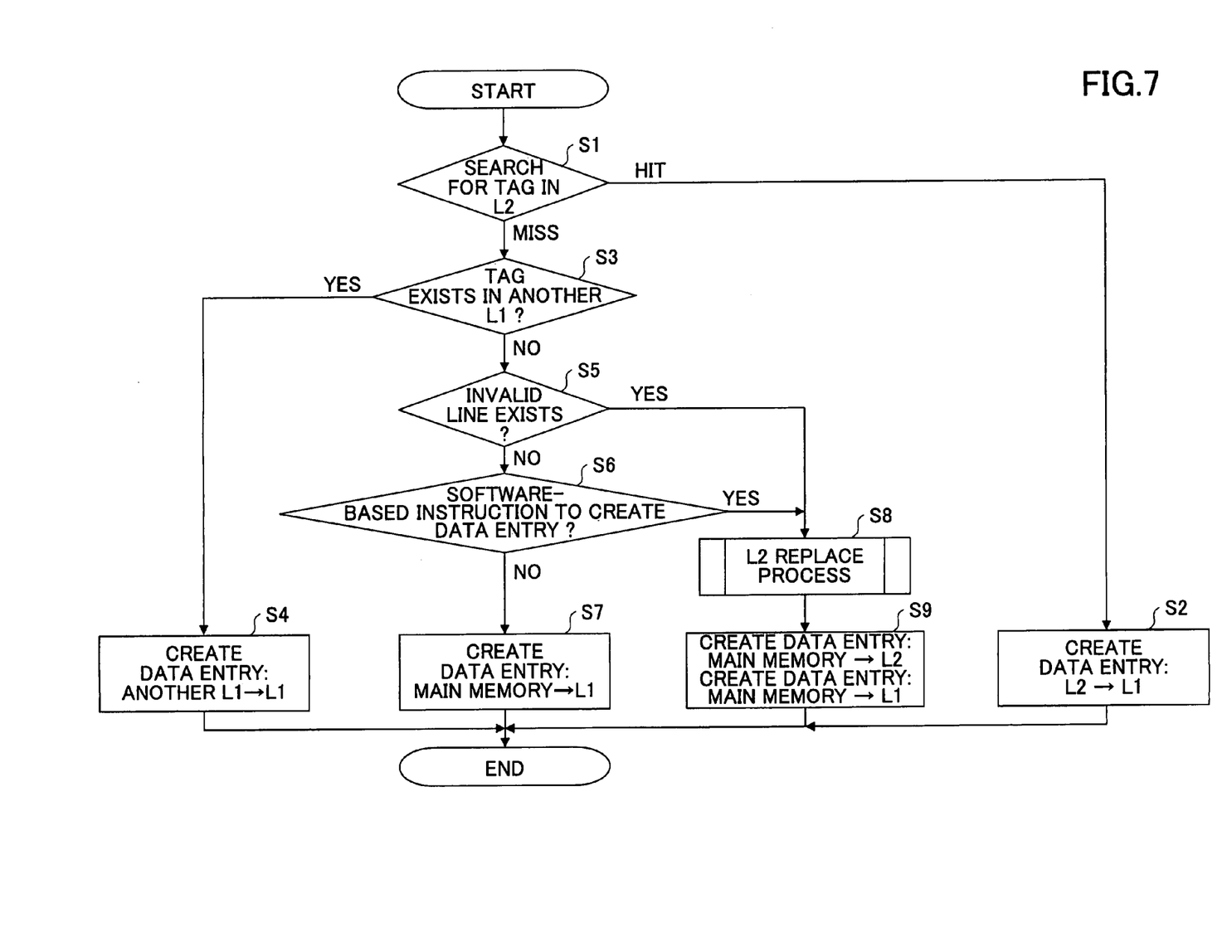
FIG. 7 is a flowchart showing a process performed when a memory access ends up being a cache miss with respect to a primary cache, and is then performed with respect to a secondary cache in a multi-core configuration as shown in FIG. 6.

FIG. 7 is a flowchart showing a process performed when a memory access ends up being a cache miss with respect to the primary cache 14A, and is then performed with respect to the secondary cache 15 in the multi-core configuration as shown in FIG. 6.

At step S1, a tag is searched for in the secondary cache (L2) 15. If a hit is detected, at step S2, the data that is hit in the secondary cache 15 is stored as a data entry in the primary cache 14A. Namely, the data is stored in the data register portion 22 of the primary cache 14A, and the corresponding tag is stored in the tag register portion 21 of the primary cache 14A, with the corresponding valid bit being set to a valid state.

If the tag search results in a cache miss at step S1, a check is made as to whether the data to be accessed is in existence in another primary cache (L1). In the configuration shown in FIG. 6, for example, if a cache miss occurs with respect to the primary cache 14A and also with respect to the secondary cache 15, then, the tag is searched for in the other primary cache 14B to check whether a hit is detected. If the data is present in the other primary cache 14B, at step S4, the data that is hit in the other primary cache (L1) 14B is stored as a data entry in the primary cache (L1) 14A.

If the data does not exist in any primary cache (L1), a check is performed at step S5 as to whether there is an invalid line. If there is no invalid line, a check is made by software at step S6 as to whether there is an instruction for L2 data entry.

If the check at step S6 finds that there is no instruction for L2 data entry, at step S7, the main memory device 11 is accessed to read data therefrom, and the read data is stored as a data entry only in the primary cache 14A. The data is not stored as a data entry in the secondary cache 15.

If it is ascertained at step S5 that there is an invalid line, a replace process is performed at step S8, which may cause the cache data of the invalid line of the secondary cache 15 to be transferred to the main memory device 11 according to need. Likewise, if it is ascertained at step S6 that there is an instruction for L2 data entry, a replace process is performed at step S8 to select a cache line to be replaced in the secondary cache 15, which may cause the cache data of this cache line of the secondary cache 15 to be transferred to the main memory device 11 according to need, followed by invalidating the cache line. Thereafter, at step S9, the main memory device 11 is accessed to read data therefrom, and the read data is stored as a data entry in the secondary cache 15, and is also stored as a data entry in the primary cache 14A.

In the processes described above, data retrieved from the main memory is stored as a data entry in the primary cache, but is not stored as a data entry in the secondary cache if there is no invalid line in the secondary cache and if no instruction to create a data entry in the secondary cache is given by software. This is because, in the non-inclusive system of the present invention, there is no absolute need to create a data entry in the secondary cache for the data for which a data entry is created in the primary cache. Here, in order to implement a software-based instruction, a dedicated control register may be provided to store data that indicates the creation/no-creation of data entry in the secondary cache. Alternatively, the instruction set may be expanded to include a load/store instruction that indicates the creation/no-creation of data entry in the secondary cache.

Such software-based control of instruction for L2 data entry is also applicable to the configuration of the first embodiment. In the present invention, it is important that corresponding data is not invalidated in the primary cache 14 at the time of data replacement in the secondary cache 15. At the time of creating a new data entry for data retrieved from the main memory device 11, such data entry is generally created both in the primary cache 14 and in the secondary cache 15, which is a basic operation that is expected to be performed in the present invention. Such an operation, however, is not an absolute necessity in an extreme case.

In the present invention, either the write-through method or the write-back method can be employed. It should be noted, however, that when the write-back method is employed in the non-inclusive system that does not guarantee the inclusion condition, data transfer to the main memory device 11 may become necessary at the time of data replacement in the primary cache 14. In the present invention, further, there is no need to invalidate the secondary cache when data is transferred from the secondary cache for storage as a new data entry in the primary cache. However, provision may be made such that when data is transferred from the secondary cache for storage as a new data entry in the primary cache, invalidation of the secondary cache is performed. In a multi-core configuration, when data is transferred from one primary cache to another primary cache for storage as a new data entry, there is no need to store the data as a data entry in the secondary cache. However, provision may be made such that the data is also stored as a data entry in the secondary cache.

Further, the present invention is not limited to these embodiments, but various variations and modifications may be made without departing from the scope of the present invention.

What is claimed is:

1. A cache system, comprising:
   a processing device operative to access a main memory device;
   a primary cache coupled to said processing device, said primary cache being accessible from said processing device at faster speed than the main memory device; and
   a secondary cache coupled to said processing device via said primary cache, said secondary cache being accessible from said processing device at faster speed than the main memory device,
   wherein said primary cache and said secondary cache are configured such that first data is stored as a data entry in each of said primary cache and said secondary cache when the first data is read from the main memory device in response to access from said processing device, and such that second data in the secondary cache is invalidated without invalidating the second data in the primary cache when a need arises to replace a cache line corresponding to the second data in the secondary cache upon a miss in the secondary cache in response to access from said processing device, thereby breaking an inclusion condition between the primary cache and the secondary cache at a time of data replacement in the secondary cache.

2. The cache system as claimed in claim 1, wherein said primary cache and said secondary cache are configured such that third data in the secondary cache is invalidated when the third data is transferred from said secondary cache to said primary cache for storage as a data entry in said primary cache in response to access from said processing device.

3. The cache system as claimed in claim 1, further comprising: another processing device operative to access the main memory device; and another primary cache coupled to said another processing device and to said secondary cache.

4. The cache system as claimed in claim 3, wherein data is transferred from said another primary cache to said primary cache for storage as a data entry.

5. A cache system, comprising:
a processing device operative to access a main memory device;
a primary cache coupled to said processing device, said primary cache being accessible from said processing device at faster speed than the main memory device; and
a secondary cache coupled to said processing device via said primary cache, said secondary cache being accessible from said processing device at faster speed than the main memory device,
wherein said primary cache and said secondary cache are configured such that first data is kept as valid data in said secondary cache when the first data is transferred from said secondary cache to said primary cache for storage as a data entry in said primary cache in response to access from said processing device, and such that second data in the secondary cache is invalidated without invalidating the second data in the primary cache when a need arises to replace a cache line corresponding to the second data in the secondary cache upon a miss in the secondary cache in response to access from said processing device, thereby breaking an inclusion condition between the primary cache and the secondary cache at a time of data replacement in the secondary cache.

6. The cache system as claimed in claim 5, wherein said primary cache and said secondary cache are configured such that third data is stored as a data entry in each of said primary cache and said secondary cache in a first operation mode, and is stored as a data entry in said primary cache without being stored as a data entry in said secondary cache in a second operation mode when the third data is read from the main memory device in response to access from said processing device.

7. The cache system as claimed in claim 5, further comprising:
another processing device operative to access the main memory device; and
another primary cache coupled to said another processing device and to said secondary cache.

8. The cache system as claimed in claim 7, wherein data is transferred from said another primary cache to said primary cache for storage as a data entry.

9. A method of cache management, comprising:
providing a processing device operative to access a main memory device;
coupling a primary cache to said processing device, said primary cache being accessible from said processing device at faster speed than the main memory device;
coupling a secondary cache to said processing device via said primary cache, said secondary cache being accessible from said processing device at faster speed than the main memory device;
storing first data as a data entry in each of said primary cache and said secondary cache when the first data is read from the main memory device in response to access from said processing device;
invalidating second data in the secondary cache without invalidating the second data in the primary cache when a need arises to replace a cache line corresponding to the second data in the secondary cache upon a miss in the secondary cache in response to access from said processing device, and breaking an inclusion condition between primary cache and the secondary cache at a time of data replacement in the secondary cache.

* * * * *